INVENTORS
William E. McCown, deceased,
by Mattie L. McCown, Executrix,
Carey M. Allen, Gerald A. Callies,
and Eugene H. Heimrich
BY Collins & Oberlin
ATTORNEYS

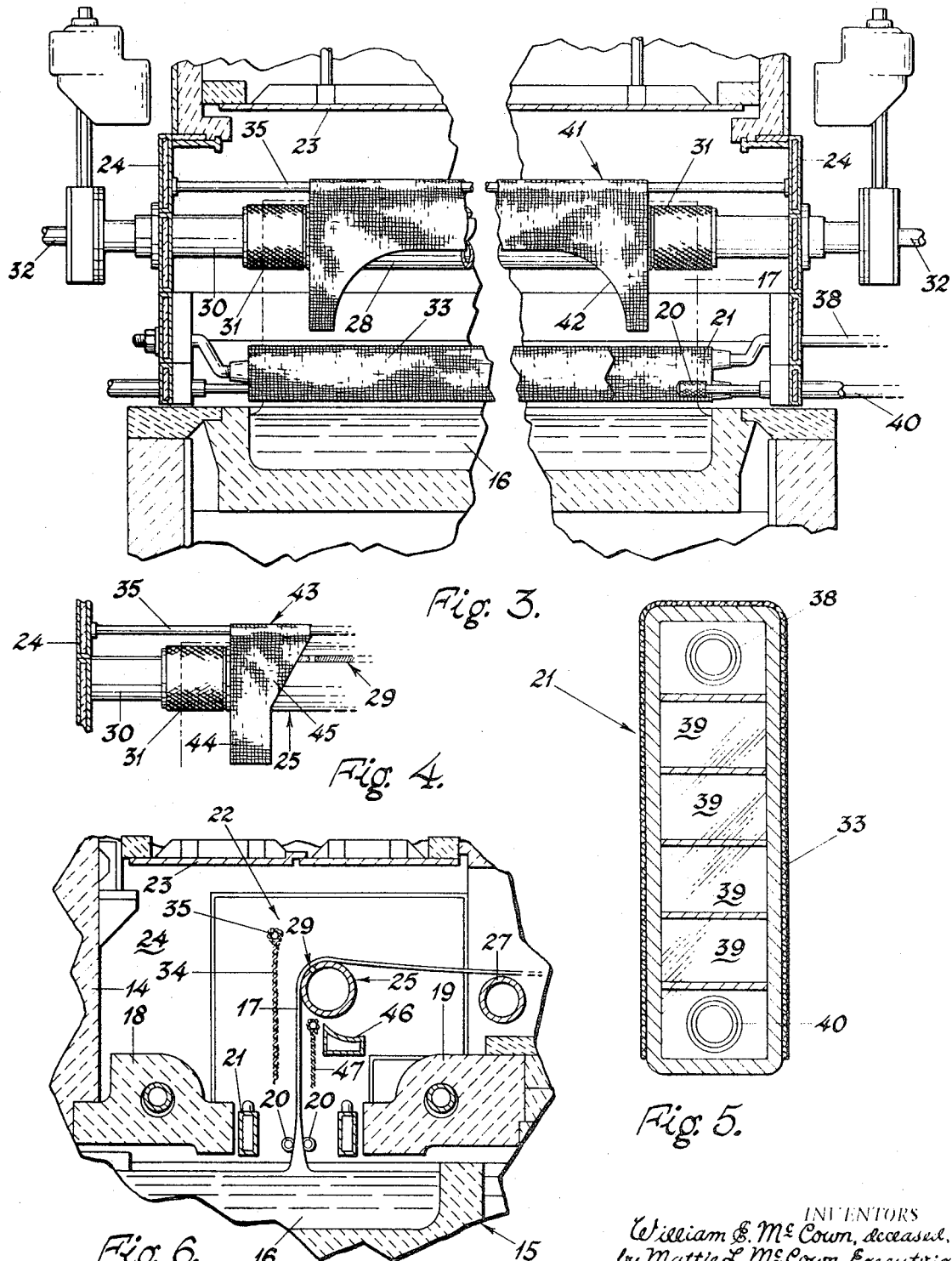

United States Patent Office

3,583,860
Patented June 8, 1971

---

3,583,860
METHOD AND APPARATUS FOR CONTROLLING HEAT FLOW FROM A DRAWN SHEET OF GLASS
William E. McCown, deceased, late of Toledo, Ohio, by Mattie L. McCown, executrix, and Carey M. Allen, Gerald A. Callies, and Eugene H. Heimrich, Toledo, Ohio, assignors to Libbey-Owens-Ford Company, Toledo, Ohio
Filed Dec. 23, 1968, Ser. No. 786,480
Int. Cl. C03b *15/02*
U.S. Cl. 65—95
11 Claims

ABSTRACT OF THE DISCLOSURE

Controlling the temperature of a sheet of glass being drawn upwardly from a bath of molten glass and deflected into a substantially horizontal plane about a bending member while separated therefrom by a fluid film. Heat removal from the vertically rising sheet and air currents within the drawing chamber are regulated so that a ribbon of uniform thickness is formed and as the ribbon is deflected about the bending member its temperature is uniform from side to side and it is sufficiently pliable to follow the contour of the bending member without dragging over certain areas thereof.

BACKGROUND OF THE INVENTION

Field of the invention

The invention relates broadly to the supporting and conveying of a glass sheet or ribbon while in a highly heated, plastic condition, and more particularly to regulating the temperature of such a sheet or ribbon as it is drawn upwardly from a mass of molten glass and deflected about a stationary bending member on a fluid film. It has been found that temperature differentials in the sheet due to thermal currents and unequal heat transfer in the zone of sheet formation may cause it to drag over the bending member in certain areas so that its surface is damaged from an optical standpoint.

Description of the prior art

As explained in U.S. Patent No. 3,137,556, issued June 16, 1964 to A. E. Badger et al., window or sheet glass, which is flat drawn glass having fire polished surfaces attained during formation of the sheet, is produced in accordance with one well-known process by continuously drawing a sheet or ribbon upwardly from a mass of molten glass maintained in a working receptacle or draw pot, and deflecting it over a so-called bending roll while in a highly heated, plastic condition for passage through a substantially horizontal annealing lehr. A major disadvantage of producing glass in this manner has been the adverse effect which the bending roll may have on the surface quality of the sheet. When the highly heated sheet comes in direct contact with the roll, slight imperfections in the roll surface imprint on the surface of the sheet to cause the undesirable condition in the sheet known as bottom dirt, and the combination of these imperfections with temperature conditions of the roll and surface of the ribbon cause an undesirable condition on the bottom surface of the sheet known as sheen.

In order to avoid this direct contact between the bending roll and sheet and thereby to eliminate the undesirable effects on the sheet occasioned thereby, it has been proposed to create a film or cushion of aeriform fluid, such as heated air, between the sheet and roll. Thus, the roll remains stationary while the sheet is moved thereover on the fluid film.

Heat is extracted from the upwardly rising sheet to cause it to become substantially set in its final form before being deflected about the bending member. The coolers heretofore generally employed for this purpose operate at relatively low surface temperatures, and thus tend to create convection currents within the forming chamber so that uneven temperatures are created in the molten glass and ribbon. Uneven temperatures at the surface of the mass of molten glass result in thickness variations across the sheet. The areas of the ribbon which are cooled excessively become overly stiff, and thus they do not adequately follow the contour of the bending member in being deflected thereabout. Consequently, the sheet may drag over the bending member in contact with its surface in certain areas instead of being separated therefrom by the fluid film, thereby creating surface defects in corresponding areas of the sheet.

SUMMARY OF THE INVENTION

According to the present invention, the temperature of the sheet is reduced to a uniform level at which it can be deflected about the bending member on the fluid film without dragging in contact with the bending member in any area. Regulation of the temperature of the sheet is accomplished by positioning adjacent the surfaces thereof heat exchangers and heat conservers adapted to operate at relatively high surface temperatures so as to minimize formation of convection currents within the drawing area. The temperature is thereby gradually reduced as the sheet is drawn upwardly, while a substantially uniform temperature is maintained transversely across its width so that as it is deflected it will have the proper degree of plasticity to follow the contour of the bending member across its entire width while supported on the fluid film. Also, as a result of elimination of convection currents, distortion due to thickness variation across the sheet is dramatically reduced.

A primary object of the invention, therefore, is to eliminate defects due to dragging of the sheet or ribbon across the bending member in the production of sheet or window glass with a so-called air flotation bending member wherein a sheet is drawn vertically upward from a bath of molten glass and deflected about a bending member on a fluid film into a substantially horizontal plane.

Another object of the invention is to gradually and uniformly reduce the temperature of the ribbon of glass being drawn upwardly from the mass of molten glass so that its temperature will be substantially uniform across its width as it is deflected about the bending member.

Sill another object is to thus reduce the temperature of the ribbon of glass while minimizing harmful convection currents in the drawing chamber.

Other objects and advantages of the invention will become apparent during the course of the following description, when taken in connection with the accompanying drawings.

BRIEF DESCRIPTION OF THE DRAWINGS

In the drawings, wherein like numerals are employed to designate like parts throughout the same:

FIG. 3 is a transverse vertical section similar to FIG. 2 but showing an alternate embodiment of the heat shield;

FIG. 4 is a fragmentary transverse vertical section through a portion of the drawing chamber showing still another embodiment of the heat shield;

FIG. 5 is an enlarged transverse section through a heat exchanger of the invention adapted to operate at high surface temperature; and FIG. 6 is a longitudinal vertical section through the drawing chamber showing an alternate embodiment of the invention.

Figure 1:
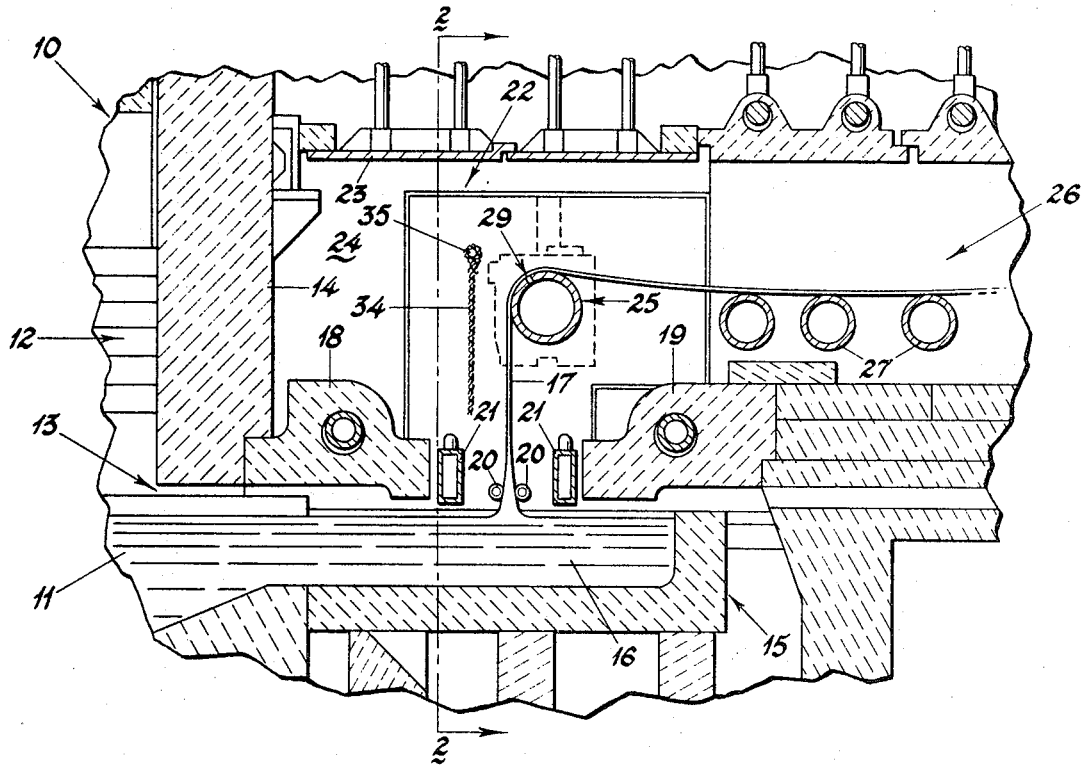
FIG. 1 is a longitudinal vertical section through the drawing chamber area of a sheet glass furnace embodying the invention.

Referring now to the drawings and in particular to FIG. 1, there is shown generally at 10 the outlet end of the cooling chamber of a continuous tank furnace of any conventional or preferred construction in which a mass of molten glass is continuously produced, refined and cooled to proper working temperature. The molten glass, indicated at 11, flows from a cooling chamber 12 through an opening 13 beneath a cooling chamber end wall 14 into a working receptacle 15 to form a relatively shallow pool 16 of molten glass, from which a sheet or ribbon 17 is continuously drawn.

Front and rear lip-tiles 18 and 19, respectively, located over the molten glass at the entrance end and rear of the working receptacle create a generally quiescent zone over the molten glass and through which the sheet is drawn upwardly during its formative stage. Pairs of knurled rolls 20 conventionally engage the sheet along either margin to establish and maintain it at the proper width, and coolers 21 are located adjacent either surface to absorb heat from the newly formed sheet and cause it to set as it is drawn upwardly. The sheet 17 is drawn vertically for a short distance within a drawing chamber designated generally at 22 and comprising the end wall 14, a roof 23 and opposite side walls 24, and is then deflected about a bending member 25 for passage through an annealing lehr 26 on a series of substantially horizontally aligned rolls 27.

Although the sheet 17 is substantially set in its final form at the point where it is deflected about the bending member 25, it is still in a highly heated, softened condition so that contact with the bending member may adversely affect its viewing quality. Thus, it has been proposed to interpose a fluid between the sheet and bending member so that the sheet floats over the bending member out of contact therewith on a fluid film. In order to accomplish this the bending member 25 includes a tubular central section 28 having a longitudinally extending slot 29 in its wall. Trunnion sections 30 extending from the ends of the tubular section are journalled in a conventional manner to permit the bending member to be rotated about its longitudinal axis in the manner of a conventional bending roll at such times as desired, for example, when starting the sheet or changing bending members. Knurled sleeves 31 journalled on the trunnion sections rotate freely and carry the marginal edges of the sheet as it is deflected about the bending member. The sleeves thus tend to guide the sheet and maintain its width in this region.

Conduits 32 connected to the ends of the trunnion sections supply fluid under pressure and heated to the proper temperature from an external source (not shown) to the interior of the bending member. The preheated, pressurized fluid then flows through the slot 29 from the interior of the tubular section 28 to form the fluid film between the glass ribbon and bending member.

As previously described, it has been found in producing sheet glass in accordance with this process that under certain circumstances localized areas of the sheet or ribbon become cooled to such an extent that they do not adequately follow the contour of the bending member as they are deflected thereabout. This is particularly true along the marginal edges of the ribbon, which tend to lose heat mose rapidly due to their proximity to the side walls, and where convection currents can have a most serious effect. It is believed that in these areas the upwardly rising sheet, due to its overly stiff or rigid condition, does not assume the proper geometrical configuration in passing over the bending member. It thus runs into and drags over the bending member instead of being separated therefrom by the fluid film. Consequently the surface of the sheet in that area is damaged.

The temperature of the glass, which as the meniscus through which the sheet is drawn is on the order of 1650° F., is reduced to approximately 1100° F. at the bending member. The surface temperature of conventional sheet coolers is close to that of the coolant flowing therethrough, on the order of 90° to 100° F. It has been found that the convection currents and uneven heat losses occasioned by these relatively cold bodies can be substantially reduced and for all practical purposes eliminated by having the coolers 21 adjacent the lower portion of the sheet operate at relatively high surface temperatures (for example in the range from 300° to 100° F., preferably about 600° F.) and suspending heat conservers or insulating shields at least partially across the width of the ribbon in the vicinity of the bending member. In other words, with the coolant at a temperature of about 100° F., a temperature differential of from 200° F. to 900° F. is maintained between the interior of the cooler and its exterior surface. Thus, the arrangement of coolers and heat conservers serves to lower the temperature of the sheet while inhibiting formation and movement of convection currents in the zone of sheet formation, so that erratic localized cooling is prevented.

Figure 2:
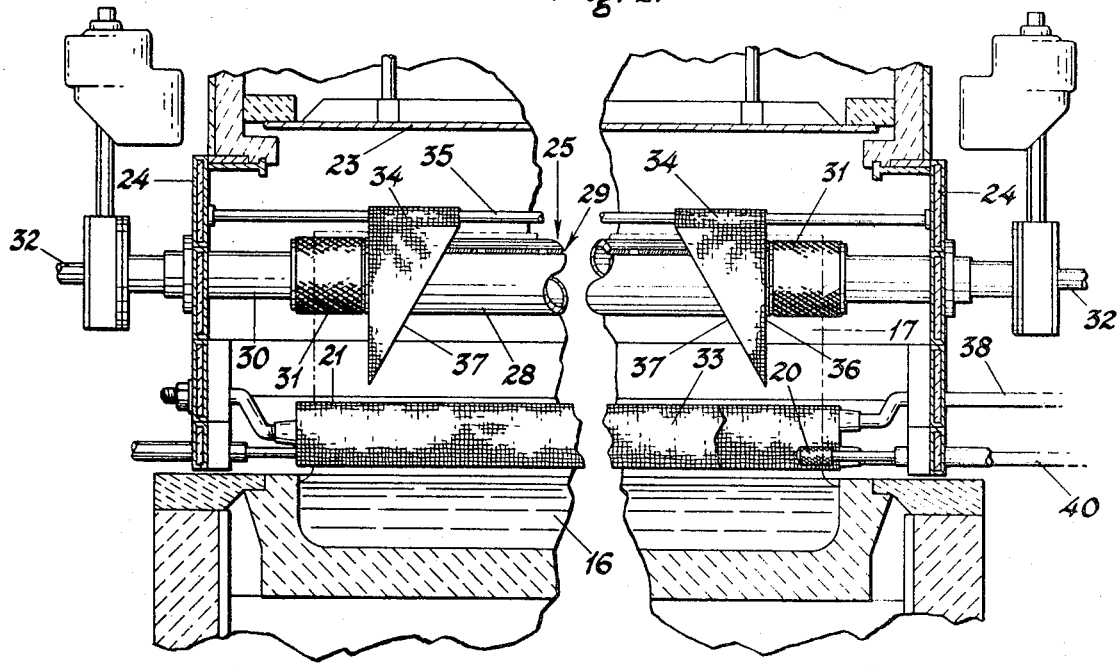
FIG. 2 is a transverse vertical section through the drawing chamber taken substantially along line 2—2 of FIG. 1.

According to a preferred embodiment, as illustrated in FIGS. 1 and 2, this temperature control is achieved by coating at least the major surfaces of the coolers 21 with a layer 33 of heat resistant material which is essentially impervious to radiant heat but which will transmit heat at a controlled rate by conduction, and positioning insulating panels 34 adjacent the sheet as it is deflected over the bending member. A cooler coated in this manner, for example, and operated at a surface temperature of 600° F., has about 90 percent of the heat removal capacity of a conventional cooler operate at a surface temperature of 100° F. The panels are suspended from a rod 35 extending across the drawing chamber 22 so that they can be moved axially therealong to the desired operating position. While they may be formed of any suitable material which will withstand the temperature in that area and serve to reduce heat loss in adjacent areas of the sheet, a flexible material such as a quartz cloth has been found particularly suitable. Thus, if in operation it should be deemed desirable to reduce the heat conserving effect of the panels, they can be partially or completely rolled up on the rod 35.

The panels 34 are illustrated in FIG. 2 as being triangular in shape, with their vertical edge 36 preferably positioned near the inner end of the knurled sleeve 31 upon which the margins of the sheet ride over the bending member. These margins which ride on the knurled sleeve are, of course, trimmed from the sheet, and it is in the area inwardly thereof where it is desired to eliminate dragging. The triangular shape of the panels, that is, the inclination of the edges 37 thereof and resulting decrease in depth of the panels from the edges toward the middle of the sheet, serves to blend their heat conserving effect inwardly from the edges of the sheet so that it does not experience an abrupt change at the point where the panels end.

The coolers 21 themselves may be of any conventional or preferred construction, such as those having from four to ten passages for circulation of heat absorbing fluid. Typically in such coolers a heat absorbing medium, generally water, enters at the end through a supply conduit 38, flows back and forth in interconnected conduits 39, and is discharged at the same end of the cooler through an effluent line 40. While the layer 33 of heat resistant material may completely surround the cooler, it has been found that the lower wall facing the molten bath or pool 16 does not contribute significantly to convection currents in the drawing area, and the effect of this portion of the cooler on the surface of the molten bath plays an important part in the formation of the sheet.

Thus, the layer 33 may advantageously cover only the top and side walls of the cooler and be omitted from the bottom wall as illustrated in FIG. 5.

The material employed in the layer 33 must have sufficient insulating capacity so that its outer surface can be maintained at a relatively high temperature while heat is conducted away from its rear surface and through the adjacent wall of the cooler without the heat absorbing fluid in the cooler becoming excessively heated to the point where boiling might occur. Thus, an equilibrium situation is established with the exterior surface of the layer 33 at the desired operating temperature, wherein heat is conducted away from the rear surface at the same rate as it is absorbed by the exterior surface. For example, excellent results have been obtained with a layer 33 comprised of asbestos cloth 1/16 inch in thickness cemented to the coolers. After drying, the asbestos cloth is painted with a black, high temperature paint. The paint is allowed to dry for about twelve hours, and the coolers are then heated in a kiln at 1500–1600° F. to burn the binder out of the asbestos and paint. They are again repainted and reburned, and are then ready for installation in the window glass machine.

It will be understood that the desired high sheet cooler surface temperature for exposure to the ambient atmosphere of the drawing area can also be achieved in other ways. Thus, the interior surfaces of the cooler walls might be coated with a heat retarding material, or a heat transfer medium which can operate at high temperatures such as Dowtherm, made by the Dow Chemical Co. of Midland, Mich., might be employed. The cooler wells themselves might also be made of a material having suitable heat transfer capacity to permit maintenance of a high surface temperature without overheating of the heat transfer medium.

There is shown in FIG. 3 an alternate embodiment of the invention wherein a single insulating or heat conserving panel 41 extends entirely across the sheet. The panel is basically rectangular with a segment removed from its lower portion intermediate the ends. Thus, its lower edge 42 is contoured so that the heat conserving effect across the sheet is substantially proportional to the natural tendency of the sheet to lose heat. For a short distance adjacent the edges of the sheet, which tend to lose heat most rapidly, the panel has its greatest width. The lower edge then curves upwardly to gradually decrease the width of the panel to the minimum in the intermediate region where the rate of heat loss is lower. The curved areas provide a gradual transition in heat conserving effect between the ends and the intermediate area. As will be apparent, the panel can be rolled up on the rod 35 to vary its over-all effect on the sheet as operating conditions warrant.

The embodiment of the insulating panel illustrated in FIG. 4 is similar to that of FIGS. 1 and 2, except that it provides somewhat more heat conservation at the edges of the sheet. Thus, the panel 43 has a rectangular segment 44 for maximum heat conservation at the edge of the sheet, combined with a triangular blending segment 45 by which the heat conserving effect is gradually reduced.

While the heat conserving panels of the invention have thus far been described as being formed of a fabric which will withstand high temperatures such as quartz cloth, it will be understood that other suitable materials might also be employed in their fabrication. For example, they can be formed of stainless steel or a light-weight ceramic material. Should additional heating be required in this area, the panels may also be formed of heat radiating material so that burners may selectively be directed thereagainst to cause them to radiate heat to the adjacent sheet. Alternatively, the panels themselves may comprise electrical resistance heating elements.

Additional control over the temperature of the glass ribbon may be exercised by positioning insulating panels adjacent its rear surface as illustrated in FIG. 6. Thus, the coated sheet coolers 21 are located opposite the surfaces of the sheet at its base and the insulating panels 34, 41 or 43 are suspended adjacent the front surface as hereinbefore described. A conventional bending roll cooler 46 extends across the drawing chamber beneath the bending member 25 to absorb heat therefrom so as to prevent it from warping and assist in maintaining it at the proper operating temperature. Insulating panels 47 are suspended beneath the bending member 25 and between the cooler 46 and sheet or ribbon 17. The panels 47 may be of a configuration generally similar to those shown at 34, 41 or 43, and may be formed of a high heat resistant material such as quartz cloth as previously described. Good results have also been obtained in preventing dragging of the sheet using as the panel 47 a stainless steel plate 3/16" x 12" x 6" positioned about two inches from the sheet with its longitudinal axis transverse to the sheet and its outer edge about even with the inner end of the knurled sleeve. The panels 34 can then be manipulated by rolling on the rod 35 to give the optimum operating conditions.

By controlling the temperature of the glass ribbon in accordance with the present invention, dragging over the bending member in localized areas due to uneven cooling can be virtually eliminated. Consequently, the yield of acceptable glass is materially increased, resulting in substantial savings both in glass and in handling.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. In a method of producing sheet glass wherein a ribbon of glass is continuously drawn upwardly from a bath of molten glass through a forming zone and deflected about a bending member into a substantially horizontal plane while separated from the bending member by a fluid film, the improvement comprising the steps of effecting a transfer of heat from the newly formed sheet between said bending member and said bath of molten glass to a surface of a cooler adjacent said sheet, retarding the flow of heat from said surface through the wall of said cooler to maintain said surface at a predetermined relatively high temperature below that of said sheet and in the range from about 300° F. to 1000° F., and flowing heat absorbing fluid through said cooler at a rate sufficient to remove heat conducted from said surface through the wall of said cooler and maintain said surface at said predetermined temperature.

2. In apparatus for producing sheet glass including a working receptacle containing a mass of molten glass, means drawing a continuous sheet upwardly from said mass, a bending member about which the sheet is deflected into a substantially horizontal plane for passage through an annealing lehr, and means interposing a fluid film between said sheet and said bending member, the improvement comprising a cooler extending transversely of and spaced from said upwardly rising sheet between said mass of glass and said bending member, a layer of thermal insulating material at least partially covering said cooler and forming a heat absorbing surface adapted to be maintained at a predetermined relatively high temperature between about 300° F. and 1000° F., and means circulating a heat absorbing fluid through said cooler for removing heat conducted through the walls thereof, the combined heat conductivity of said insulating material and the wall of said cooler being such as to conduct heat therethrough from said heat absorbing surface to said heat absorbing fluid at a rate to maintain said surface at said predetermined temperature.

3. A method of producing sheet glass as claimed in claim 1, including the step of conserving heat in selected areas of said sheet within said forming zone after said transfer of heat to equalize the temperature across said sheet as it is deflected about said bending member.

4. A method of producing sheet glass as claimed in claim 3, wherein heat is radiated to said sheet in said selected areas.

5. Apparatus for producing sheet glass as claimed in claim 2, including an insulating panel mounted above said heat exchanger and adjacent said sheet for retarding heat loss from said sheet.

6. Apparatus for producing sheet glass as claimed in claim 5, including an insulating panel mounted adjacent each edge of said sheet as it is deflected over said bending member.

7. Apparatus for producing sheet glass as claimed in claim 5, wherein said insulating panel extends substantially across the width of said sheet and varies in width in proportion to the natural tendency of the sheet to lose heat.

8. Apparatus for producing sheet glass as claimed in claim 5, including an additional insulating panel mounted adjacent the opposite surface of said sheet from said first named panel.

9. Apparatus for producing sheet glass as claimed in claim 5, including means heating said panel whereby said panel radiates heat to said adjacent sheet.

10 Apparatus for producing sheet glass as claimed in claim 2, wherein said layer of insulating material is essentially impervious to radiant heat energy.

11. Apparatus for producing sheet glass as claimed in claim 2, wherein said layer of insulating material comprises a layer of asbestos cloth cemented to said cooler and painted with a black, high temperature paint.

References Cited

UNITED STATES PATENTS

| 3,355,276 | 11/1967 | Javaux | 65—196X |
| 3,476,539 | 11/1969 | McCown et al. | 65—196X |

FOREIGN PATENTS

| 960,497 | 2/1962 | Great Britain | 65—205 |

ARTHUR D. KELLOGG, Primary Examiner

U.S. Cl. X.R.

65—194, 196, 204

PO-1050
(5/69)

UNITED STATES PATENT OFFICE
CERTIFICATE OF CORRECTION

Patent No. 3,583,860                    Dated    June 8, 1971

Inventor(s)    William E. McCown et al

It is certified that error appears in the above-identified patent and that said Letters Patent are hereby corrected as shown below:

Col. 2, line 50, cancel "Sill" and insert --Still--

Col. 3, line 69, cancel "mose" and insert --most--

Col. 4, line 3, cancel "as" and insert --at--

Col. 4, line 14, cancel "100° F." and insert --1000° F.--

Signed and sealed this 16th day of November 1971.

(SEAL)
Attest:

EDWARD M. FLETCHER, JR.            ROBERT GOTTSCHALK
Attesting Officer                  Acting Commissioner of Patents